United States Patent

Brannon

[15] 3,653,409
[45] Apr. 4, 1972

[54] POWER ASSIST SERVO CONTROL FOR A VALVE

[72] Inventor: Edward O. Brannon, Racine, Wis.
[73] Assignee: Rex Chainbelt Inc.
[22] Filed: Jan. 4, 1971
[21] Appl. No.: 103,385

[52] U.S. Cl. .......................................137/625.63, 91/368
[51] Int. Cl. ........................................................F16k 11/07
[58] Field of Search ..................137/625.63, 625.6, 625.61, 137/596.15, 596.14, 596.16, 625.64; 251/31; 91/368, 382

[56] References Cited

UNITED STATES PATENTS

| | | | |
|---|---|---|---|
| 2,456,361 | 12/1948 | Atteslander | 91/368 X |
| 2,641,228 | 6/1953 | Adams | 137/625.25 X |
| 2,790,427 | 4/1957 | Carson | 137/625.61 |
| 2,944,527 | 7/1960 | Vander Kaay | 137/625.25 X |
| 3,055,383 | 9/1962 | Paine | 137/625.21 X |

Primary Examiner—Alan Cohan
Assistant Examiner—Robert J. Miller
Attorney—Hofgren, Wegner, Allen, Stellman & McCord

[57] ABSTRACT

A power assist servo control for a valve wherein a valve spool has opposed pilot areas with a first pilot area acted upon by pilot pressure and a second pilot of larger area is acted upon by a selectively variable pressure of a lesser value than full pilot pressure and including a servo sleeve coacting with a servo ramp movable with the valve spool, a servo spool for controlling the pressure drop between pilot pressure and tank through a pair of orifices defined by a servo spool land and holes in the servo sleeve connecting to a passage leading to the second pilot area whereby an intermediate pressure between the two orifices is established to act upon the second pilot area, and means remotely operable for positioning the servo spool to vary the size of said two orifices relative to each other to resultingly change the pressure acting on the second pilot area and position the valve spool accordingly with the null point being reached by movement of the servo sleeve by the servo ramp to bring the two orifices back to an equal size.

10 Claims, 3 Drawing Figures

Patented April 4, 1972

3,653,409

INVENTOR.
EDWARD O. BRANNON
Hofgren, Wegner, Allen,
BY Stellman & McCord.
ATTORNEYS.

3,653,409

POWER ASSIST SERVO CONTROL FOR A VALVE

BACKGROUND OF THE INVENTION

This invention pertains to a servo force amplifier and, more particularly, to a power assist servo control wherein the main control valve can handle large system pressures acting on the valve spool of the main valve by means of a servo control which is remotely settable to control the position of the main valve spool and which substantially minimizes the effect of Bernoulli forces on the valve spool position.

The main valve disclosed herein is a pilot operated four-way valve having three positions and being spring centered. Four-way valves have been solenoid operated and have also been hydraulically operated by pilot pressures applied to opposite ends thereof. A solenoid controlled valve does not provide for fine metering control and, if such is done by hydraulic controls, external and Bernoulli forces can affect the position of the valve. Applicant's invention provides for fine metering control for the valve which is handling large system pressures with minimal force required for positioning and, further minimizes the effect of external or Bernoulli forces.

SUMMARY OF THE INVENTION

An object of this invention is to provide a new and improved power assist servo control for a valve which is operated by pilot pressure and wherein the valve spool of the valve may be accurately positioned and maintained in such position under remote control and with minimal effect thereon by external and Bernoulli forces.

Still another object of the invention is to provide a power assist servo control for a valve having a valve spool with opposed pilot areas and with the second of the pilot areas having a larger area than the first and wherein pilot pressure is applied to the first pilot area, a servo sleeve and servo spool are provided with structure to define a pair of orifices providing pressure drops between pilot pressure and tank with the pressure established between the orifices being applied to the second pilot, and wherein the servo sleeve coacts with a servo ramp movable with the valve spool to detect the position of the valve spool and the servo spool is remotely operable in response to a command for positioning of the valve spool.

A further object of the invention is to provide a power assist servo control as defined in the preceding paragraph having the additional features of the servo sleeve and servo spool being movable along a path at an angle to the movement of the valve spool whereby the movement of the servo spool and sleeve in controlling the valve spool can be less than the movement of the valve spool and, additionally, wherein the servo ramp can have a surface with sections of differing slope to provide different ratios of servo sleeve movement to valve spool movement wherein a finer metering control of the valve spool can be obtained over a relatively longer length of movement of the servo sleeve.

DESCRIPTION OF THE PREFERRED EMBODIMENTS

Figure 1:
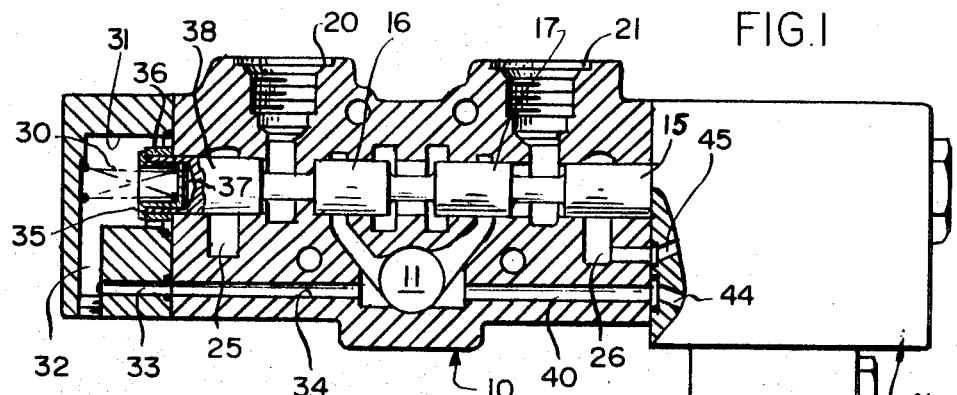
FIG. 1 is a plan view of the four-way valve and power assist servo control associated therewith with the four-way valve shown in central section and with a part of the power assist servo control broken away.

The four-way valve has a body, indicated generally at 10, with system pressure located within a chamber 11 and supplied to a bore having a valve spool 15 located therein. The valve spool has a pair of lands 16 and 17 controlling communication of system pressure to either of cylinder ports 20 or 21 or for blocking communication to both ports in the valve centered position shown in FIG. 1. The valve body 10 further is provided with exhaust passages 25 and 26, which connect to tank.

With the valve spool 15 positioned by hydraulic forces, the use of centering springs is not critical; however, they are provided as a standby or emergency precaution. One of these centering springs is shown at 30, positioned within a chamber 31 which connects by passages 32 and 33 to a passage 34 in the valve body which directs system pressure to the chamber 31. Alternatively, rather than directing a controlled system pressure to this chamber, a suitable controlled pilot pressure can be directed thereto. The spring centering mechanism includes a spring guide 35 which has a limit position determined by a stop 36 with the guide having an aperture 37 whereby pilot pressure can act against an end 38 of the valve spool 15. A continuation 40 of the passage 34 leads to a control body, indicated generally at 41, of the power assist servo control. A second passage 42 extends from the exhaust passage 26 to the control body 41. The passages 40 and 42 connect with a pair of passages 44 and 45, respectively, in the control body 41 which open to a bore 46 of the control body at spaced locations.

Figure 2:
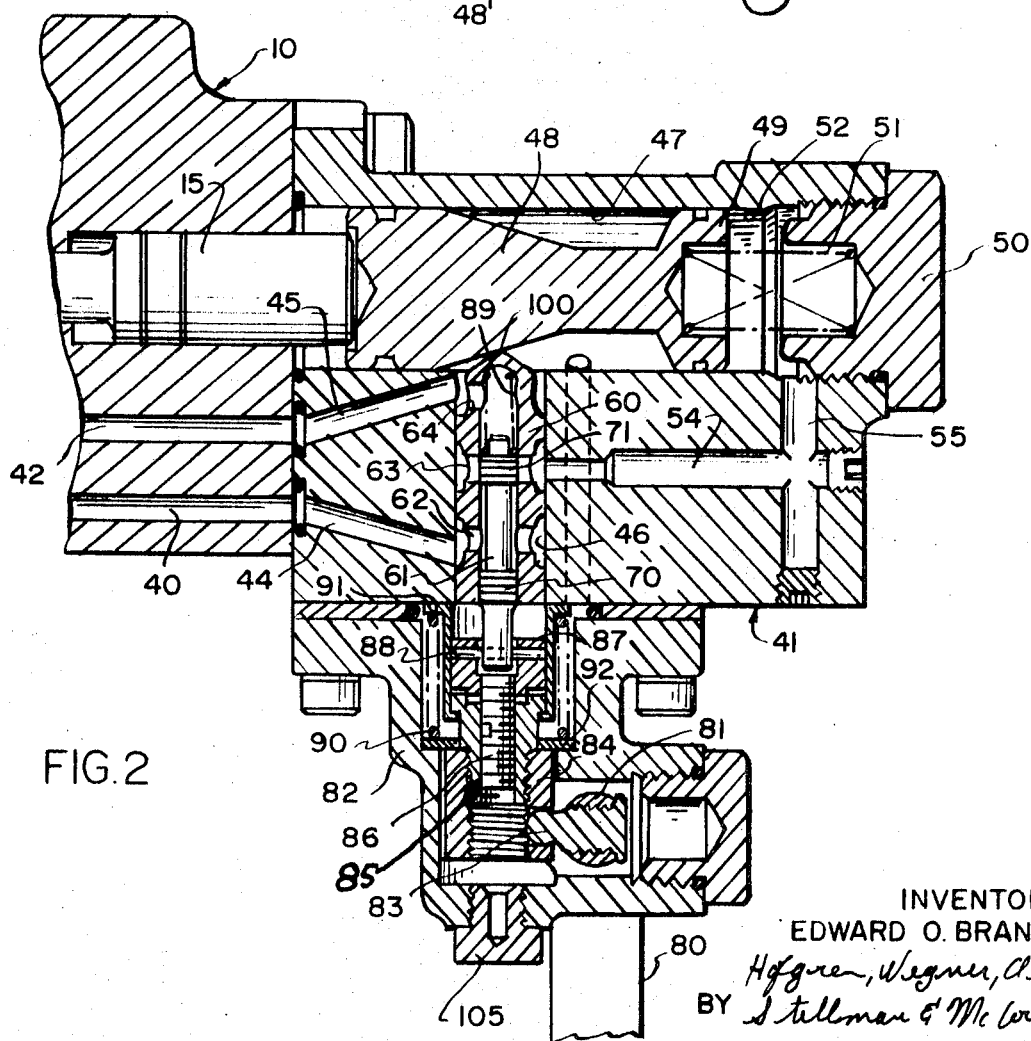
FIG. 2 is a fragmentary view of a portion of the structure shown in FIG. 1, on an enlarged scale, with the four-way valve and power assist servo control shown in central section.

A second bore 47 in the control body 41 is coaxial with the valve spool 15 and movably receives an end of the valve spool 15 and a servo ramp 48 which abuts against the last-mentioned end of the valve spool 15, as shown in FIG. 2. The servo ramp has a control piston 49 at an end thereof defining a second pilot in opposition to the pilot end 38 of the valve spool 15 and having an area twice the size of the valve spool end 38. The end of the bore 47 is closed by a threaded cap 50 which receives a centering spring 51 engaging against the servo ramp 48 and acting in opposition to the centering spring 30. The control piston 49 moves in a chamber 52, defined by a portion of the bore 47, and receives fluid at a pressure set by the servo control and which communicates therewith through a pair of passages 54 and 55 in the control body 41. The passage 54 extends from the bore 46 and is intersected at right angles by the passage 55 extending to the chamber 52.

The bore 46 movably receives a servo sleeve 60 which movably mounts a servo spool 61 therein. The servo sleeve 60 has three sets of circumferentially spaced holes spaced along the length thereof, identified at 62, 63, and 64. The hole set 62 receives pilot pressure from the passage 44 and communicates this fluid to the interior of the servo sleeve. The hole set 63 connects the servo sleeve interior with the passage 54 in the control body 41. The hole set 64 connects the interior of the servo sleeve with the exhaust passage 45.

The servo spool 61 has a sealing land 70 and a control land 71, with the latter land coacting with the sleeve hole set 63. The length of the land 71 is slightly greater than the diameter of the holes in hole set 63 to provide only a slight overlap with the land diameter being an amount sufficiently less than the inner circumference of the servo sleeve 60 whereby the diametral clearance and slight overlap provides a pair of orifices across opposite ends of the land 71. With the servo spool 61 in the null position, shown in FIG. 2, pilot pressure delivered through passage 44 results in flow in equal amounts through the orifice at the upstream or leading end of the land 71 and through the orifice at the downstream or trailing end of the land 71, as shown in FIG. 2. The equal flow through each of the orifices provides equal pressure drops, with the result that the pressure existing in passage 54 and applied to the control piston 49 is one-half of pilot pressure. With the area of control piston 49 being twice that of valve spool end 38, the valve spool 15 is hydraulically held in centered position.

If the servo spool 61 is moved upwardly, as viewed in FIG. 2, the size of the orifice or opening at the upstream end of land 71 is increased and the size of the orifice at the downstream end of the land is decreased to substantially block flow to exhaust passage 45, allowing a higher pressure more close to pilot pressure to act on the control piston 49. Moving the servo spool 61 downwardly, as viewed in FIG. 2, reverses the relation to decrease the upstream opening at land 71 and increase the downstream opening, whereby pilot pressure is substantially blocked and pressure acting on the control piston is lowered by increased opening to the exhaust passage 45.

The position of the servo spool 61 can be remotely controlled by a suitable linkage, or other control, acting on a lever 80 which connects to a shaft 81 rotatably mounted in a body end section 82 attached to control body 41 of the power assist servo control. The shaft 81 carries a lever 83 which engages a movable sleeve 84 movable in a bore in the end section 82 and which is threaded to a sleeve 85. The sleeve 85 threadably receives a member 86 having an enlarged end 87, with a pin 88 extending transversely therethrough which also extends loosely through an opening in an end of the servo spool 61. A spring 89 mounted in the servo sleeve 60 engages the opposite end of the servo spool 61 to take up the looseness in the connection of the pin 88 to the servo spool.

The servo spool 61 is spring centered by a spring 90 acting between a collar member 91 and a disc 92; with the collar 91 engaging against a shoulder on the sleeve 85. The force of the spring 90 is sufficient to center the servo spool 61 and the lever 80.

The servo sleeve 60 has an end 100 which follows the surface of the servo ramp 48.

In initially setting-up the power assist servo control, the valve spool 15 is brought into centered position with resultant positioning of the servo sleeve 60 through tuning of servo spool 61 by rotation of the threaded member 86 relative to the sleeve 85 with access thereto being obtained by removal of a cap 105 threaded into end section 82. This tuning of the servo spool 61 brings the servo control to the initial null point and sets the two orifices provided by land 71 to equal sizes to balance the pressure forces acting oppositely to position the valve spool 15.

As described previously, the servo spool 61 can be moved in either direction by movement of the lever 80 to either increase or decrease the pressure acting on the control piston 49, with resultant movement of the valve spool 15 to the left, as viewed in FIG. 2, if the pressure increases and movement to the right if the pressure decreases.

Assuming the servo spool 61 is moved a fixed amount, the valve spool 15 and servo ramp 48 will move a distance sufficient and in the direction necessary to bring the servo sleeve 60 to a position wherein a new null position is reached where the orifices are of the same size and pressure forces acting oppositely against the valve spool 15 are balanced. This position is maintained until the lever 80 is again moved and if lever 80 is moved to a neutral position the servo will go to its initial null position and valve spool 15 will go to its centered position.

The bore 46 is at an angle to the bore 47 for the servo ramp and the slope provided on the servo ramp surface is less than 45° whereby the strokes of the servo sleeve 60 and valve spool 15 are other than in a one-to-one ratio and a small amount of servo sleeve movement can control a larger amount of valve spool movement. The relationship between the bores, as shown, is at right angles; however, this angle can be other than 90°, with a suitable slope selected for the surface of the servo ramp 48.

External and Bernoulli forces have only minimal effect on the position of the valve spool 15 since slight movement will result in rapid pressure changes against piston 49. Additionally, the Bernoulli forces do not act against lever 80, minimizing operator effort.

Figure 3:
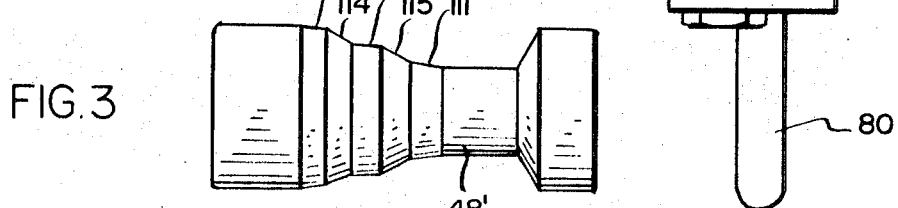
FIG. 3 is a plan view of a modified form of servo ramp providing for different ratios of servo control stroke to valve spool stroke to provide for finer metering control of the four-way valve.

An alternate form of servo ramp 48' is shown in FIG. 3 wherein the surface of the servo ramp is made up of sections of varying slope to provide a finer metering control in operation of the valve spool 15. The end sections 110 and 111 and the central section 112 have a moderate slope, while the intermediate sections 114 and 115 have a greater slope. The end sections 110 and 111 represent movement of the valve spool 115 in moving through the seal area, while the center section 112 represents movement of the valve spool in open position.

The intermediate sections 114 and 115 represent the positions of the valve spool 15 in metering. The steeper slope provided in these latter sections results in a relatively greater rate of movement of the servo sleeve 60 whereby a finer metering control is obtained within an over-all maximum stroke of the servo sleeve 60. A lesser amount of the servo sleeve movement is then required for uncritical control of the valve spool 15 when in open position and when in the seal portions of its stroke.

I claim:

1. A power assist servo control for a valve having a valve spool with opposed pilot areas with a first pilot area subjected to pilot pressure and the second pilot area being larger than the first and subjected to an adjustable pressure, a servo ramp movable with said valve spool, a servo sleeve engageable with said ramp and movable in a path angularly related to the path of movement of said valve spool, a servo spool positioned within the servo sleeve, said servo spool and servo sleeve having coacting means to maintain a pressure less than pilot pressure acting on said second pilot area which positions said valve spool and servo ramp to bring said servo sleeve and servo spool into balanced relation, and remotely operable means for moving said servo spool relative to said servo sleeve.

2. A power assist servo control as defined in claim 1 wherein the path of said servo sleeve is at right angles to the path of movement of said valve spool, and said servo ramp has a slope to provide other than a one-to-one relation in travel of said valve spool and said servo sleeve.

3. A power assist servo control as defined in claim 2 wherein said servo ramp has a surface with sections of differing slope to provide varying amounts of servo sleeve movement in proportion to movement of the valve spool.

4. A power assist servo control for remote operation of a valve, said valve having a movable valve spool with opposed pilot areas adjacent opposite ends thereof with a first pilot area subjected to pilot pressure and a second pilot area of twice the area subjected to a selectively variable pressure less than pilot pressure, said servo control including a servo ramp movable with said valve spool, a body section having a bore extending at an angle to the central axis of said valve spool and having three passages communicating therewith, one passage providing a source of pilot pressure, the second passage connecting said bore to exhaust and the third passage connecting said bore to the second pilot area, a hollow servo sleeve in said bore and having an end engageable with said ramp and a series of holes to connect the sleeve interior with said passages, a servo spool movable in said servo sleeve and having a land coacting with the sleeve holes which are adjacent the passage leading to the second pilot area of the valve spool, and means for positioning said servo spool relative to said servo sleeve to control the flow across both ends of said land to set a ratio of pressure drop from pilot pressure across the land ends and determine a pressure acting on said second pilot area with the magnitude thereof determining the direction of movement of the valve spool, said valve spool movement causing movement of the servo ramp and shift of the servo sleeve until the servo sleeve and servo spool are in position to set an equal pressure drop across both ends of said servo spool land and balance the opposing forces acting on the valve spool.

5. A power assist servo control as defined in claim 4 including spring centering means for center positioning of said servo spool, and means for adjusting said servo spool relative to the spring centering means to tune the servo control to the null point.

6. A power assist servo control as defined in claim 5 including a lever arm pivoted to said body section and an element movable therewith and operatively connected to said servo spool for positioning of the latter.

7. A power assist servo control as defined in claim 4 wherein the bore in said body section is at a right angle to the central axis of said valve spool and said servo ramp has a slope of less than 45° whereby the strokes of the valve spool and said servo sleeve are related but not equal.

8. A power assist servo control as defined in claim 4 wherein said servo ramp has a plurality of inclined sections at differing slopes whereby the ratio of the valve spool and servo sleeve strokes will vary at different portions of the valve spool stroke.

9. A power assist servo control as defined in claim 4 wherein said servo spool land when in null position relative to the servo sleeve has its ends defining a pair of orifices and with the pressure drop from pilot pressure to tank occurring in equal amounts through each orifice to have a pressure equal to one-half pilot pressure acting on said second pilot area and wherein Bernoulli forces acting on said valve spool are minimized since a slight movement of the valve spool results in movement of the servo sleeve to increase the size of one orifice and decrease the size of the other.

10. A power assist servo control for remote operation of a valve, said valve having a movable valve spool with opposed pilot areas adjacent opposite ends thereof with a first pilot area subjected to pilot pressure and a second pilot area of twice the area subjected to a selectively variable pressure less than pilot pressure, said servo control including a bore with three passages communicating therewith, one passage providing a source of pilot pressure, the second passage connecting said bore to exhaust and the third passage connecting said bore to the second pilot area, a hollow servo sleeve in said bore and movable by said valve spool and having a series of holes to connect the sleeve interior with said passages, a servo spool movable in said servo sleeve and having a land coacting with the sleeve holes which are adjacent the passage leading to the second pilot area of the valve spool, and means for positioning said servo spool relative to said servo sleeve to control the flow across both ends of said land to set a ratio of pressure drop from pilot pressure across the land ends and determine a pressure acting on said second pilot area with the magnitude thereof determining the direction of movement of the valve spool, said valve spool movement causing movement of the servo sleeve until the servo sleeve and servo spool are in position to set an equal pressure drop across both ends of said servo spool land and balance the opposing forces acting on the valve spool.

* * * * *